United States Patent

Loose

[15] 3,700,794

[45] Oct. 24, 1972

[54] IMPROVEMENTS IN OR RELATING TO TELEVISION CAMERA CLAMPING ARRANGEMENTS

[72] Inventor: Peter William Loose, Essex, England

[73] Assignee: The Marconi Company Limited, London, England

[22] Filed: Sept. 28, 1970

[21] Appl. No.: 76,170

[30] Foreign Application Priority Data

Nov. 1, 1969 Great Britain..........53,661/69

[52] U.S. Cl...............................178/7.1, 178/DIG. 26

[51] Int. Cl...............................................H04n 5/16

[58] Field of Search........ 178/DIG. 26, 7.3 DC, 7.2, 7.5 DC

[56] References Cited

UNITED STATES PATENTS

| | | | |
|---|---|---|---|
| 3,526,710 | 9/1970 | Martin | 178/7.1 DC |
| 3,551,596 | 12/1970 | Boreastein | 178/7.3 DC |
| 3,418,425 | 12/1968 | Thompson | 178/7.1 DC |

*Primary Examiner*—Richard Murray
*Attorney*—Baldwin, Wight & Brown

[57] ABSTRACT

A video signal level clamping arrangement for a television camera in which input video signals are clamped to a fixed potential once during each line flyback. The clamped video signals are fed to a signal path into which signals are gated, each of the signals extending for at least the duration of one line flyback period. The resultant spurious free waveform is clamped to a further fixed potential source which is controlled such that it does not clamp during line flyback or outside field suppression. The waveform resulting from the last mentioned clamping is amplitude clipped to produce a stabilized D.C. level corresponding to a predetermined shade, e.g., black.

10 Claims, 2 Drawing Figures

Figure 1:
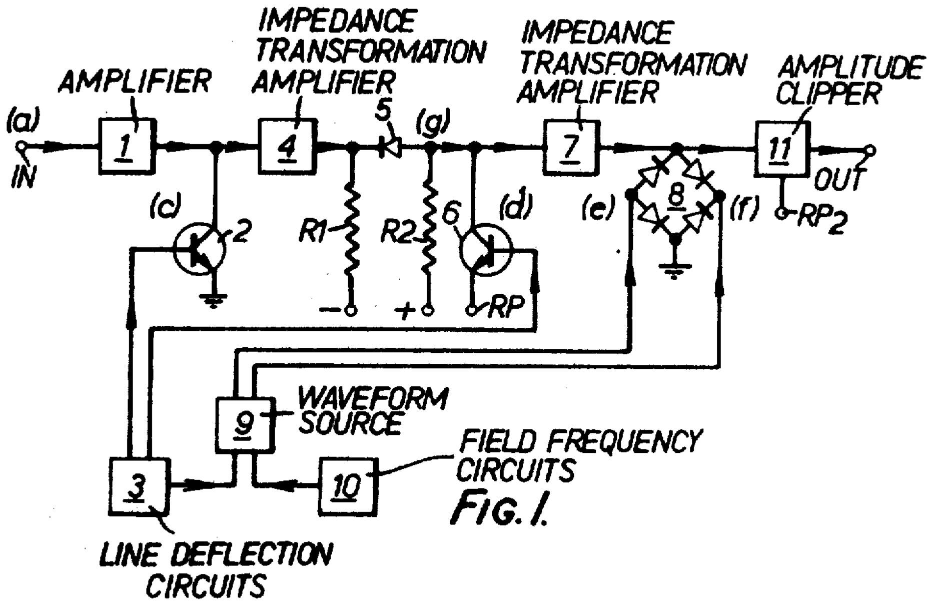

INVENTOR
Peter William Loose
BY
Baldwin Wight & Brown
ATTORNEYS

IMPROVEMENTS IN OR RELATING TO TELEVISION CAMERA CLAMPING ARRANGEMENTS

This invention relates to television cameras and, though applicable with advantage to both monochrome (black and white) cameras and color television cameras, is particularly advantageously applicable to color television cameras.

The invention is concerned with level clamping of the video signals in television cameras. In terms of current practice this means level clamping to black level, though, theoretically, clamping to some other level, e.g., white level, might be required.

It is, of course, necessary for the distortionless amplification of video signals, that all frequencies, from D.C. to the highest video frequency, shall be treated alike. In practice, the A.C. and D.C. conditions present in complex video amplifying chains such as are usually employed in a television camera prevent the obtaining of such equal amplification independent of frequency. For this reason, it is normal practice to resort to line by line clamping in a video signal chain, so as to enable a D.C. component which has been lost to be re-inserted at a desired point. The signal produced by a television camera tube contains a time repetitive "reference" black occurring during the period when the tube is line blanked. In current practice, this time repetitive reference black is utilized in line by line clamping, which samples this reference black and refers it to a pre-determined fixed reference potential, commonly earth.

However, in current television cameras, whether monochrome or color, line and field deflection is obtained by line and field deflecting coils in a deflection yoke. During line fly-back there is a very high rate of change of deflection current in the line-deflecting coils and very high peak voltages are built up therein. These peak voltages are picked up to a greater or less extent by the tube and cause spurious signals having a frequency higher than the line repetition frequency to appear in the video signal output therefrom—in practice considerable care and precaution are taken to keep such pick-up as small as possible but, despite all precautions, there is always some residual pick-up and spurious signals appear in the output during line fly-back. Such signals are by no means negligible because the video signal output of a camera tube is quite small in terms of voltage and also because the video output is subjected to amplification by head amplifiers of wide band and high gain. Accordingly, if the black level occurring during line fly-back is sampled to obtain a reference level for clamping purposes, the presence of these spurious signals in the video output disturbs the reference black voltage level. The results is that the black level will change with variations of spurious signal pick-up in the tube and variations of video gain will vary the amplitudes of the spurious signals picked up, again causing changes in black level. These effects are very undesirable even in a monochrome camera, but in a color television camera with several color signal tubes, these effects are very serious indeed, for a change in black level in one component color chain will almost certainly not be the same as, and occur at the same time as, a change in the other chains. The result is to produce serious color errors at black level, where they will be most noticeable. In order to avoid the foregoing difficulties, it is customary to seek to cancel out spurious signals produced during line fly-back by generating and superimposing equal and opposite compensating signals which are usually superimposed at some point in the head amplifier. However, the practicing of this expedient is very difficult for it involves careful and correct adjustment of the compensating signals to ensure reasonably complete cancellation of the spurious signals. As the spurious signals actually obtained are likely to be different for each tube and each deflection yoke, even though of the same nominal design, compensation by cancellation involves careful measurement of the behavior of each television camera tube and yoke and the generation of compensating signals empirically adjusted in the light of such measurements. Even then, the obtaining of stable cancellation depends upon the obtaining of stable adjustments and this, too, is difficult to achieve in practice. For these reasons, the method of compensation by cancellation by superimposed signals is both expensive and difficult to practice and at best can be expected to provide only a more or less acceptable approximation to the complete cancellation which is the theoretical requirement.

The present invention approaches the problem in a quite different way and seeks to provide level clamping by a method which will operate satisfactorily, independently of whether or not spurious signals are present during line fly-back. Also, as will be seen later, the invention provides a method of level clamping in which variations of reference level due to mains hum, low frequency "tilt" and similar low frequency interference, are avoided.

According to this invention in its broadest aspect video signal level clamping in a television camera is effected at times which occur both within the field suppression period and outside line flyback.

According to a feature of this invention, a stabilized D.C. level corresponding to a predetermined selected "shade" is produced in video signals obtained in a television camera by clamping effected at times each of which occurs both in a time of field suppression and in a time of useful scanning line excursion. By "a time of useful scanning line excursion" is meant a time occurring outside the times of line flyback.

Preferably the selected "shade" corresponds to black.

Preferably the clamping is effected once in each field suppression period during the major part of one useful line excursion.

In a preferred way of carrying out the invention the video signals are preliminarily clamped to a fixed potential once during each line flyback; the signals, thus preliminarily clamped, are fed to a signal path into which pulses, each of which extends at least over the duration of one line flyback, are effectively gated; the resultant of the gating-in of said pulses is clamped to a fixed potential at times each of which occurs both in a time of field suppression and in a time of useful scanning line excursion; and the waveform resulting from the last mentioned clamping is amplitude clipped to produce a substantially constant stabilized D.C. level.

Preferably the preliminary clamping is effected during a short period occurring approximately centrally within the time of line flyback.

The effective gating-in of pulses may be effected by including in said signal path a normally conductive circuit element and rendering the same non-conductive by the pulses to be gated in. This may conveniently be done by employing a normally forwardly biassed diode as said circuit element and utilizing the pulses to be gated in to render conductive a normally non-conductive switch element which, when conductive, connects one side of said diode to a reference potential source dimensioned to overcome the normal forward bias. Alternatively the effective gating-in of pulses may be effected by superimposing them in said signal path.

Preferably amplitude clipping is effected by a differential amplifier having one input fed with the wave form to be clipped and the other fed from a reference potential source.

Preferably again the clamping of the wave form which is the resultant of the aforesaid gating-in of pulses is effected by a clamping circuit constituted by a diode bridge the ends of one diagonal of which are connected respectively to a point at which said resultant appears and to a point of fixed potential and to the ends of the other diagonal of which are respectively applied opposite polarity waveforms occurring during the major part of a useful scanning line excursion taking place during field suppression.

Figure 2:
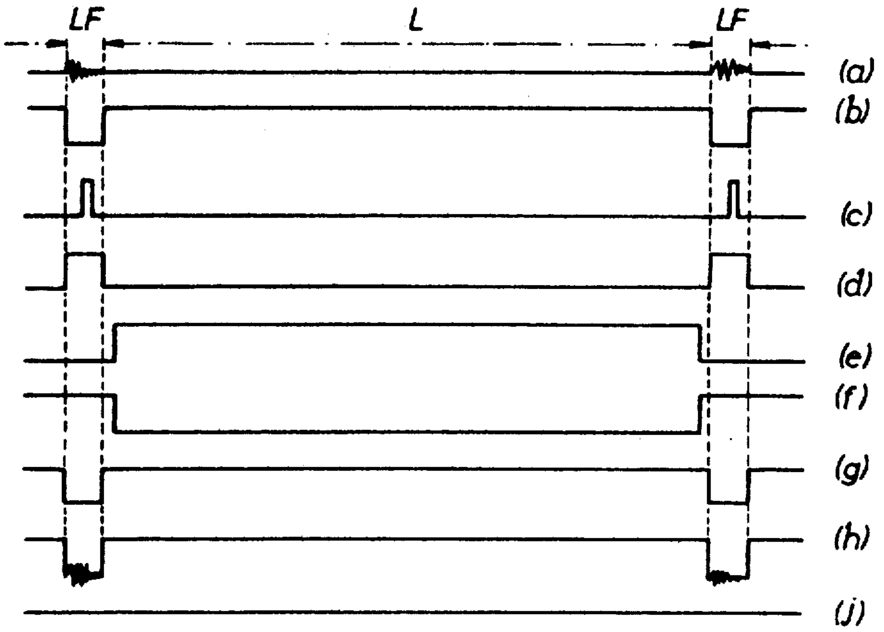

The invention is illustrated in and further explained in connection with the accompanying drawings, in which FIG. 1 is a simplified diagram of one embodiment showing it so far as is necessary to an understanding of it, and FIG. 2 is an explanatory diagram showing idealized typical wave forms. References identifying different wave forms in FIG. 2 are also inserted in FIG. 1 adjacent the points at which they occur.

Referring to the drawings, line (*a*) of FIG. 2 represents the output obtained from a television camera tube (not shown) during one line excursion L and the line flyback periods LF which precede and follow it if, as is assumed for the purpose of explanation, the tube is "viewing" a full black subject of transmission. In other words line (*a*) represents actual black level, useful video signals being not shown. This output is applied at the input terminal IN of FIG. 1. Line (*b*) in units of time represents the line deflection in the tube, line flyback occurring during the periods LF. It will be seen from line (*a*) of FIG. 2 that spurious signals occur during the periods LF, these signals being, as already explained, signals produced in the tube output due to the rapidly changing fields which are generated by the line deflecting windings (not shown) of the tube during line flyback. There are also, usually present, during the periods LF, low frequency interference signal components caused, for example, by mains (e.g. 50 c/s) hum.

The input signals at IN are amplified by an amplifier 1 the output level of which is clamped to some suitable fixed potential—shown as earth—by a normally cut-off transistor 2 which acts as a clamping switch. This switch is closed—i.e., the transistor is rendered conductive—for a short time during line flyback periods by positive going pulses, represented by line (*c*) of FIG. 2 which may be derived in any convenient known manner from the normally provided line deflection waveform circuits. The length of and the exact timing of these pulses is not critical the only essential requirement being that they occur during line flyback. As shown they occur at about the middle of each line flyback period. The line deflection waveform circuits and the means for deriving the pulses (*c*) are assumed to be within the block 3. The clamping effected by the transistor 2 establishes at the output of the amplifier 1 a D.C. level which is independent of any lower frequency interference signal components which may be present in the input at IN so that this clamping operation removes undesired effects due to mains "hum," low frequency "tilt" and the like low frequency effects.

Block 4 represents a second amplifier which is provided mainly for impedance transformation purposes, this amplifier being designed and dimensioned in known manner to present a high input impedance and a low output impedance.

Following the amplifier 4 is a diode 5 which is forward biased so as to be normally conductive. This forward biassing is obtained by means of suitable negative and positive potentials applied through resistances R1 and R2 from the terminals marked − and + respectively.

The output side of diode 5 is connected through a switch constituted by a normally cut-off transistor 6 to a source (not shown) of negative reference potential which is connected to the terminal RP. This transistor is rendered conductive during and for the period of each line flyback by positive going pulses, represented in line (*d*) of FIG. 2, produced in any convenient known way by apparatus also included in block 3. The reference potential applied at RP is such that, when the transistor 6 is conductive, the diode 5 is cut off. The arrangement is such as to produce at the output side of the diode 5, a waveform as shown by line (*g*) OF FIG. 2 from which, as will be seen, the spurious signals and low frequency interference components have been eliminated although, as will be appreciated, the D.C. level of the video signal during the active line period will change in accordance with spurious signals. The bottoms of the pulses in waveform (*g*) are fixed but their heights will change in accordance with spurious signals so that there will still exist variations in black level due to spurious signals. However, these variations are removed by the final steps of field clamping and clipping to be described below.

Instead of using the illustrated combination of diode 5 and transistor 6 which presents the waveform represented by line (*g*) of FIG. 2 and comprising negative going pulses occurring during and for the period of each line flyback, the pulses having an amplitude exceeding the maximum amplitude of the spurious signals and low frequency interference (if any) could be derived from apparatus provided in block 3 and simply superimposed upon the output from amplifier 4, e.g., by a simple resistance network. If this is done—the illustrated arrangement is, however, preferred—the spurious signals and low frequency components will not be eliminated but they will be transferred, as shown by line (*h*) of FIG. 2, to the bottoms of the pulses of the negative-going pulsed waveform shown by the said line (*h*).

The waveform of line (g) or line (h), as the case may be (depending upon which of the last described two expedients is adopted) is applied to the input of a further amplifier 7, which is also an impedance transforming amplifier presenting a high input impedance and a low output impedance.

Clamping is applied at the output side of this amplifier by a clamping arrangement which is so controlled as to be ineffective as a clamp during line flyback or at any time outside field suppression. In the illustrated and preferred arrangement this clamping switch arrangement is constituted by a diode bridge 8 and this bridge is so controlled as to effect clamping during one line deflection (or part thereof) which occurs between consecutive line flyback periods during field suppression. However, the arrangement could be so controlled as to provide effective clamping during more than one line deflection so long as it is effective only during field suppression and between line flybacks, i.e., not during a line flyback.

In the particular arrangement illustrated by FIG. 1 the diode bridge 8 has one end of one diagonal connected to the output terminal of the amplifier 7 and the other end of that diagonal connected to a point of fixed potential shown as earth. The bridge is controlled by two input waveforms as shown by lines (e) and (f) OF FIG. 2, each of which is the potential inverse of the other, and which are applied respectively to the two ends of the other diagonal of the bridge. These waveforms are produced by a waveform source represented by the block 9 and which is jointly controlled in any convenient suitable manner by line frequency circuitry included in block 3 and field frequency circuitry in block 10 which also includes the normally provided field deflection waveform circuits. It will be seen that the positive portion of the positive-going waveform (line (e) of FIG. 2) commences shortly after the end of one line flyback period and ends shortly before the beginning of the next and that the corresponding negative portion of the negative going waveform (line (f) of FIG. 2) begins and ends at these times. The actual timing of the beginning and end of these waveform portions is not critical, the essential requirement being merely that they shall both occur in periods of line deflection and not in periods of line flyback and also, of course, in a field flyback period.

The output from amplifier 7 is thus fed to a clamp which clamps only during a line deflection occurring during field flyback. The clamped waveform is applied to an amplitude clipper 11 which is designed to eliminate the negative going pulse portions included in the waveform (g)—if the illustrated arrangement is used—or in the waveform (h)—if the above described expedient of using a superimposing network in place of the diode 5 and switch-transistor 6 is employed. A preferred form for the amplitude clipper 11—this form is known per se—consists of a differential amplifier having one input fed with the clamped output from amplifier 7 and the other fed from a source of suitable reference potential which is adjusted to such value that the output from the clipper is a stabilized black level output represented by the line (j) of FIG. 2. This form of clipper is preferred because it lends itself to the production of accurate clipping to a desired level and thus enables a practically acceptable approximation to the (idealized) straight and level line shown at (j) in FIG. 2 to be obtained. The terminal referenced RP2 represents the point of connection for the reference potential source for a differential amplifier constituting the clipper 11.

It will be seen that the clamp constituted by the diode bridge 8 operates to provide clamping during one line deflection (as described during nearly the whole of this deflection, though this is not an essential feature) occurring in each field during the field flyback. In this way a clamping reference which is independent of spurious signals occurring during line flyback and also independent of mains hum and other low frequency interference, is established. This clamping reference is used, in manner well known per se, to provide a "-clean" and stable blanking line-blanking period to which subsequent clamps may be referred. It will also be seen that, before establishing this clamping reference, a negative going line pulse is, in effect, gated into the video signal path during line tube blanking (see lines (g) and (h) of FIG. 2). Ideally, the width of this pulse should be at least equal to the line flyback period. Experiment indicates that in a camera operating in accordance with the present, standard, 625 line P.A.L. system, a pulse width of 6 $\mu$ sec. is adequate to satisfy practical requirements. As will now be apparent the amplitude of this gated-in pulse should be not less than the maximum expected spurious or interference signal amplitude. For obvious practical reasons, this gated-in pulse amplitude should be chosen at a value substantially greater than said maximum expected amplitude. After this pulse has been gated in the clamping provided by clamp 8 establishes a true black D.C. level and this is taken as the clipping level for the clipper 11 which will, accordingly, provide an output unaffected by spurious and interference signals. The D.C. reference thus established once in each field flyback will appear as the wanted line tube blanking level for each line during the succeeding field. Because the period of line tube blanking is now free of spurious and interference signals, ordinary conventional clamping may be reliably and satisfactorily applied in circuits subsequent to those providing clamping in accordance with this invention.

Because the D.C. reference level is obtained by clamping only in each field flyback, interference such as mains hum or low frequency "tilt" occurring during the field which follows such clamping would be "-clamped in." It is for this reason that the clamping effected in the field flyback (by diode bridge 8 in FIG. 1) is preceded by line clamping the purpose of which is, however, not to establish a D.C. reference level but only to remove low frequency hum and other low frequency interference.

The invention has been described as applying to the clamping of black level since, in practical present day television systems, this is what is required. However, it is possible to design television systems in which the level to be established is that corresponding to white. Such systems have been proposed though, so far as the present applicants are aware, they are not used in practice. Indeed, theoretically, any "shade" could be selected as that corresponding to a level to be established. The invention is obviously applicable, in manner which will now be apparent to the skilled reader in the light of the description already given herein, to the establishment of any desired selected level in a television system irrespective of the "shade" to which that level corresponds.

The invention is applicable alike to monochrome ("-black and white") television cameras and to color television cameras. It provides a desirable improvement in monochrome cameras but it is particularly advantageously applicable to color television cameras because, in such cameras, a change in black level in one color signal chain will almost certainly not be matched by (i.e., be identical with and occur simultaneously with) black level changes in all the others. Accordingly, different black level changes in the different color signal chains are liable to cause significant and disturbing color errors at black level where their effects will be most noticeable. By applying the present invention to the different video signal chains in a color television camera, this serious defect can be avoided.

I claim:

1. A clamping arrangement for television cameras having a video signal output adapted to provide line-by-line clamping within a frame flyback period, comprising in combination:

amplifier means for amplifying said video signal output;

means for clamping the output of said amplifier means to a reference potential during periods between line scans to provide a D.C. level output from said amplifier means which is free of low frequency interference signal components;

means for gating in pulses in the output of said amplifier means during substantially the whole of said periods thereby to produce a resultant waveform which includes said pulses, said pulses having an amplitude exceeding the maximum amplitude of spurious signals which may occur during such periods;

means for clamping said resultant waveform to a fixed reference potential during a line scan period and outside said periods between line scans; and means for clipping the output of the last means to remove said pulses and provide a stabilized D.C. voltage level.

2. A camera as claimed in claim 1 wherein the preliminary clamping is effected during a short period occurring approximately centrally within the time of line flyback.

3. A camera as claimed in claim 2 wherein the effective gating in of pulses is effected by including in said signal path a normally conductive circuit element and rendering the same non-conductive by the pulses to be gated in.

4. A camera as claimed in claim 3 wherein a normally forward-biassed diode is employed as said circuit element and the pulses to be gated in are utilized to render conductive a normally non-conductive switch element which, when conductive, connects one side of said diode to a reference potential source dimensioned to overcome the normal forward bias.

5. A camera as claimed in claim 4 wherein amplitude clipping is effected by a differential amplifier having one input fed with the waveform to be clipped and the other fed from a reference potential source.

6. A camera as claimed in claim 5 wherein the clamping of the wave form is the resultant of the aforesaid gating-in of pulses is effected by a clamping circuit constituted by a diode bridge the ends of one diagonal of which are connected respectively to a point at which said resultant appears and to a point of fixed potential and to the ends of the other diagonal of which are respectively applied opposite polarity waveforms occurring during the major part of a useful scanning line excursion taking place during field suppression.

7. A camera as claimed in claim 2 wherein gating in of pulses is effected by superimposing them in said signal path.

8. A camera as claimed in claim 7 wherein amplitude clipping is effected by a differential amplifier having one input fed with the waveform to be clipped and the other fed from a reference potential source.

9. A camera as claimed in claim 8 wherein the clamping of the wave form which is the resultant of the aforesaid gating in of pulses is effected by a clamping circuit constituted by a diode bridge the ends of one diagonal of which are connected respectively to a point at which said resultant appears and to a point of fixed potential and to the ends of the other diagonal of which are respectively applied opposite polarity waveforms occurring during the major part of a useful scanning line excursion taking place during field suppression.

10. A camera as claimed in claim 1 wherein the stabilized D.C. voltage level corresponds with a picture shade of black.

* * * * *